United States Patent [19]

Drachkovitch

[11] Patent Number: 5,113,615
[45] Date of Patent: May 19, 1992

[54] SPINNING SPOON FOR FISHING CARNIVOROUS FISH

[75] Inventor: Albert Drachkovitch, 58150 Garchy, France

[73] Assignee: Astucit, Guerigny, France

[21] Appl. No.: 707,100

[22] Filed: May 29, 1991

[30] Foreign Application Priority Data

May 29, 1990 [FR] France .................. 90 06657

[51] Int. Cl.⁵ ............................ A01K 85/00
[52] U.S. Cl. .................................. 43/42.19
[58] Field of Search .................. 43/42.17, 42.19

[56] References Cited

U.S. PATENT DOCUMENTS

| | | | |
|---|---|---|---|
| 356,661 | 1/1887 | Pfaff | 43/42.19 |
| 582,677 | 5/1897 | Parker | 43/42.19 |
| 1,489,035 | 4/1924 | Knill | |
| 1,603,118 | 10/1926 | Knill | |
| 1,837,558 | 12/1931 | Lent | 43/42.19 |
| 1,990,693 | 2/1935 | Hildebrandt | 42/42 |
| 2,206,274 | 7/1940 | Wiberg | 43/45 |
| 2,902,791 | 9/1959 | Woodley | 43/42.17 |
| 3,604,140 | 9/1971 | Nelson | 43/42.19 |
| 3,918,192 | 11/1975 | Rabideau | 43/42.17 |

FOREIGN PATENT DOCUMENTS

| | | | |
|---|---|---|---|
| 3024383 | 1/1982 | Fed. Rep. of Germany . | |
| 393982 | 1/1909 | France . | |
| 542770 | 8/1922 | France . | |
| 852612 | 10/1939 | France | 43/42.19 |
| 955183 | 1/1950 | France . | |
| 1035843 | 8/1953 | France . | |
| 2546715 | 12/1984 | France . | |

Primary Examiner—Kurt Rowan
Attorney, Agent, or Firm—Fisher, Christen & Sabol

[57] ABSTRACT

A spinning spoon for fishing carnivorous fish, the spoon comprising a shaft having a hook mounted at one end thereof and having an eye at its opposite end for fixing to a fishing line, a blade and a swivel connecting one end of the blade to said shaft adjacent to said eye in such a manner as to enable the blade to rotate about the shaft under the effect of the resistance of the water through which the spoon moves. The major portion of the length of the shaft is simultaneously heavy, flexible, and rectilinear.

8 Claims, 1 Drawing Sheet

SPINNING SPOON FOR FISHING CARNIVOROUS FISH

The present invention relates to a spinning spoon lure for fishing carnivorous fish.

BACKGROUND OF THE INVENTION

It is conventional for spinning spoons to comprise the following:

a shaft, having a fish hook, generally a triple fish hook, at one end thereof and fitted with an eye at its opposite end for fixing to a fishing line, e.g. a polyamide thread or a steel cable;

a blade; and a swivel close to said eye for connecting one end of said blade to said shaft.

Thus, under the effect of the resistance of the water through which the spoon is moving, said blade spins about said shaft.

The vibrations given off by the blade spinning about the shaft are detected by the sensitive lateral line of carnivorous fish and it is these vibrations rather than the appearance of the spoon that incite carnivorous fish to bite and be caught on the hook.

In a first prior embodiment, the shaft is constituted by a simple rod, e.g. piano wire having a diameter of a few tenths of a millimeter. The shaft is thus light in weight and as a result the blade, particularly if it is elongate, spins rapidly close to the shaft and uniformly about said shaft. The vibrations emitted are thus regular and it has been observed that they are relatively less attractive to carnivorous fish than vibrations which are more irregular.

In a second prior embodiment, the shaft is leaded such that said shaft constitutes an elongate axial mass. The inertia of this axial mass provides a small amount of opposite to rotation of the blade, thus making it flap to some extent, and under such circumstances the emitted vibrations are more irregular, and thus more attractive to carnivorous fish than vibrations emitted by spoons having a lightweight shaft.

In both of these embodiments, the shaft is rigid and this gives rise to the drawback of allowing a carnivorous fish that has attacked the spoon to bear against the shaft to get itself off the hook. In the context of a lightweight shaft, a proposal has already been made to remedy this drawback (see French patents FR-A-955 183 and FR-A-1 035 843, for example) by replacing said rod with a flexible connection. In this case it becomes impossible for the carnivorous fish to bear against the shaft in an attempt to get off the hook.

An object of the present invention is to provide a spoon that avoids the vibrations due to regular rotation which are relatively unattractive, while eliminating the drawback of a rigid shaft.

SUMMARY OF THE INVENTION

To this end, the present invention provides a spinning spoon for fishing carnivorous fish, the spoon comprising a shaft having a hook mounted at one end thereof and having an eye at its opposite end for fixing to a fishing line, a blade, and a swivel connecting one end of the blade to said shaft adjacent to said eye in such a manner as to enable the blade to rotate about the shaft under the effect of the resistance of the water through which the spoon moves, wherein the major portion of the length of said shaft is simultaneously heavy, flexible, and rectilinear.

Thus, when fishing, the blade emits vibrations not only because of its rotation, but also because it is flapping, which together combine to produce attractive, irregular vibrations. In addition a carnivorous fish that has attacked the spoon cannot use the heavy shaft as a member to bear against in order to get off the hook.

It is advantageous for said shaft to comprise a succession of small masses hinged together in pairs.

To ensure that said shaft has a degree of stiffness, while nevertheless remaining flexible, it is preferable for said shaft to be disposed in a sheath of flexible material fitting closely over said masses.

Advantageously, said succession of small masses is constituted by a chain. Such a chain may be constituted merely by links that are looped through one another. In a variant, said chain may be constituted by nodules hinged together in pairs like the plug chains used in sinks or bathrooms.

In order to further increase the flapping capabilities of the blade, an additional feature of the present invention provides for the swivel that allows the blade to rotate about said shaft also to allow the blade to oscillate about its own longitudinal axis.

The oscillation of the blade about its longitudinal axis are thus added to the above-mentioned vibrations, such that the spoon exhibits irregular behavior which is particularly attractive. In addition, when the angler pays out line, the blade whirls downwards like a dead leaf, and this increases the attraction of the spoon for a carnivorous fish.

In conventional manner, the swivel may comprise a semi-circular loop that is coplanar with said shaft and free to rotate about the shaft which occupies its diameter. In this case, said oscillations of the blade about its longitudinal axis are advantageously obtained by said swivel further including a ring freely engaged firstly through said loop and secondly through a hole in the corresponding end of the blade.

Although intended for all kinds of carnivorous fish, the spoon of the present invention is particularly suitable for carnivorous fish of large size, and in particular pike. It is therefore advantageous for the blade to be of considerable length, not less than 5 cm.

In order to further increase the attractiveness of a spoon of the invention, a tuft is disposed around the hook, with the tuft being made, for example, of red wool or of shiny tinsel.

BRIEF DESCRIPTION OF THE DRAWING

Embodiments of the invention are described by way of example with reference to the accompanying drawing, in which.

In these figures, identical references are used to designate items that are similar.

DETAILED DESCRIPTION

Figure 1:
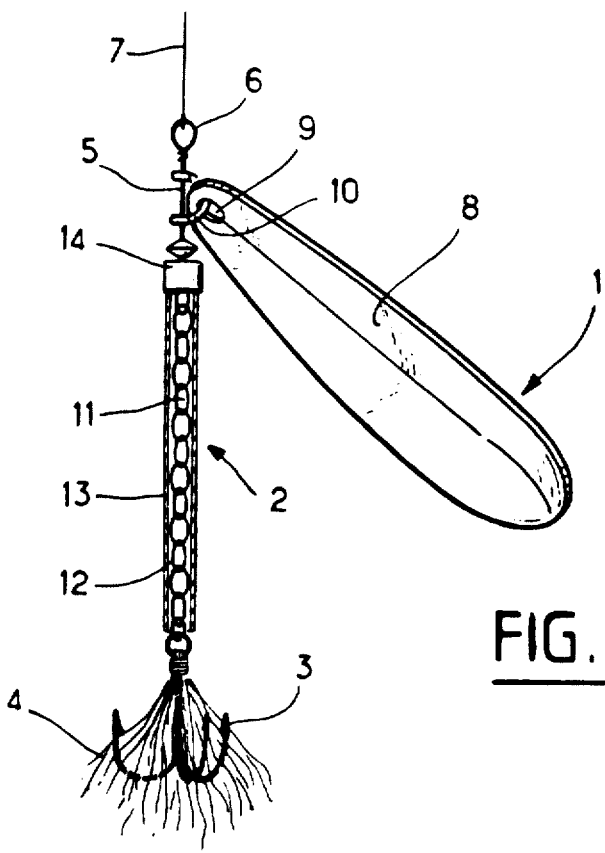
FIGS. 1 and 2 show two embodiments of a spoon lure of the present invention.

The spinning spoon 1 of the invention for fishing carnivorous fish and as shown in FIG. 1, comprises a shaft 2 having a triple hook 3 mounted at one end thereof. The hook is fitted with a tuft 4 of silver-colored or gold-colored tinsel. A rod 5 is provided at the other end of the shaft 4 and is fitted with an eye enabling the spoon 1 to be fixed to a fishing line 7.

The spoon 1 also includes an elongate blade 8 which has a hole 9 pierced therethrough close to one of its ends, a semicircular loop 10 suitable for rotating freely about its diameter relative to the rod 5 passing through the hole 9.

In accordance with the invention, the shaft 2 between the rod 5 and the hook 3 is constituted by a chain 11 constituted by inter-fitting links 12 encased in a flexible plastic sheath 13 (shown in axial section).

At least one ball 14 or the like is disposed between the chain 11 and the loop 10 to facilitate swiveling of said loop and thus of the blade 8.

A spoon is thus obtained having a shaft 2 that is heavy, but flexible.

Figure 2:
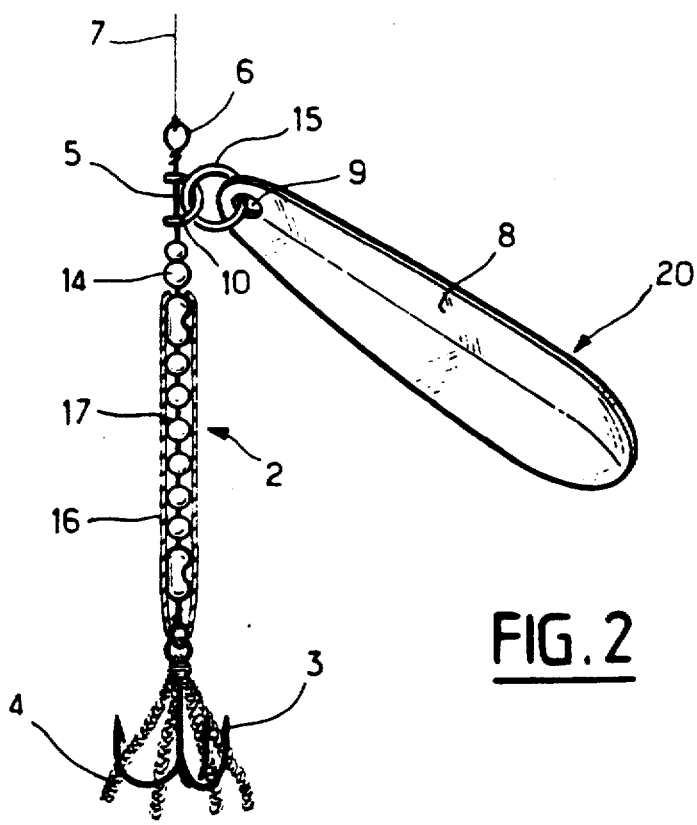

In the variant embodiment 20 of the spoon of the invention shown in FIG. 2, above described items 2 to 10, 13, and 14 reappear. However, in this case the tuft 4 is made of red wool.

In addition, a split ring 15 serves to connect the loop 10 to the blade 8, the split ring passing both through the loop 10 and through the hole 9 in the blade.

Further, in this embodiment, the shaft 2 between the rod 5 and the hook 3 is constituted by a chain 16 constituted by a series of nodules 17 which are hinged to one another like a plug chain.

Here again, a spoon is obtained having a shaft that is both heavy and flexible, and in addition the blade 8 is free both to oscillate and to whirl relative to said shaft 2.

I claim:

1. A spinning spoon (1, 20) for fishing carnivorous fish, comprising:

a shaft (2) having a hook (3) mounted at one end thereof and having an eye (6) at its opposite end for fixing to a fishing line (7);

a blade (8) able to rotate about said shaft under the effect of the resistance of the water through which the spoon moves;

wherein said shaft (2) comprises, on the side of said eye, a rod (5) about which can rotate a yoke (or swivel 10) connecting one end of said blade (8) to said shaft, and, on the side of said hook, a succession of small masses (11, 17) hinged together in pairs and disposed in a sheath (13) of flexible material fitting loosely over said masses, so that, for the major portion of its length, said shaft is simultaneously heavy, flexible and rectilinear.

2. A spoon according to claim 1, wherein said succession of small masses is constituted by a chain.

3. A spoon according to claim 2, wherein said chain is constituted by links engaged in one another.

4. A spoon according to claim 2, wherein said chain is constituted by nodules hinged together in pairs.

5. A spoon according to claim 1, wherein the swivel enabling the blade to rotate about said shaft also enables the blade to oscillate about its own longitudinal axis.

6. A spoon according to claim 5, in which said swivel comprises a semicircular loop coplanar with said shaft and free to rotate about its own diameter about the shaft, wherein the swivel further includes a ring freely engaged firstly in said loop and secondly in a hole provided through the corresponding end of said blade.

7. A spoon according to claim 1, wherein said blade is not less than 5 cm long.

8. A spoon according to claim 1, wherein said hook carries a tuft.

* * * * *